(12) United States Patent
Hwang et al.

(10) Patent No.: US 6,300,691 B1
(45) Date of Patent: Oct. 9, 2001

(54) LINEAR MOTOR WITH AN IMPROVED COOLING STRUCTURE

(75) Inventors: Ji Hyun Hwang; Do Hyun Kim; Hyun Joo Hwang, all of Kyungki-do; Jang Sung Chun, Seoul, all of (KR)

(73) Assignee: Mirae Corporation, Choongchungnam-Do (KR)

( * ) Notice: Subject to any disclaimer, the term of this patent is extended or adjusted under 35 U.S.C. 154(b) by 0 days.

(21) Appl. No.: 09/547,057

(22) Filed: Apr. 10, 2000

(30) Foreign Application Priority Data

Aug. 13, 1999 (KR) ................................................. 99-16695
Aug. 13, 1999 (KR) ................................................. 99-33440
Aug. 13, 1999 (KR) ................................................. 99-33444

(51) Int. Cl.[7] ............................. H02K 9/22; H02K 1/20; H02K 1/32
(52) U.S. Cl. ............................................................. 310/12
(58) Field of Search ..................... 310/12, 13, 14; 33/1 M; 74/471 XY

(56) References Cited

U.S. PATENT DOCUMENTS

| | | | |
|---|---|---|---|
| 4,916,340 | * 4/1990 | Negishi | 310/12 |
| 5,825,104 | 10/1998 | Kondo et al. | 310/12 |
| 5,831,352 | 11/1998 | Takei | 310/12 |
| 6,130,490 | * 10/2000 | Lee | 310/12 |

* cited by examiner

*Primary Examiner*—Nestor Ramirez
*Assistant Examiner*—Judson H. Jones
(74) *Attorney, Agent, or Firm*—Rosenberg, Klein & Lee

(57) ABSTRACT

The present invention relates to a linear motor with an improved cooling structure for cooling heat generated from a coil block of the motor. The linear motor includes a stator element having a stator element frame, a movable element having a movable element frame, adapted to linearly move along the stator, and a heat dissipation plate mounted on the stator element frame and the movable element frame, for externally dissipating heat generated from a coil block. Such a structure can prevent over-heating of the linear motor by dissipating heat generated from the motor coil to thereby cool the motor.

8 Claims, 6 Drawing Sheets

LINEAR MOTOR WITH AN IMPROVED COOLING STRUCTURE

BACKGROUND OF THE INVENTION

1. Field of the Invention

The present invention relates to a linear motor with an improved cooling structure for cooling heat generated from a coil block of the motor.

2. Description of the Conventional Art

A conventional linear motor, shown in FIG. 1, is comprised of a stator element 10, and a movable element 20 adapted to move along the stator element 10. The stator element 10 has a U-shaped stator element frame 11 provided with sequentially arranged permanent magnets 12 thereon each having polarity of N- and S-poles. Inside the stator element 10, is provided the movable element 20 being comprised of a coil block 21 and a movable element frame 22. The coil block is provided with a coil (not shown). When an external electric current is applied to the coil block 22, a thrust, being capable of pushing the movable element 20, is generated according to Fleming's left-hand rule. The thus generated thrust force permits direct linear motion of the movable element 20 along the stator 10.

In contrast, a linear motor having a movable element 20 provided with permanent magnets includes a stator element 10 having a coil block 21. When electric current is supplied to the coil block 21, the movable element 20 having permanent magnets performs a linear motion along the stator element 10. With the continued supply of current to the coil block 21 so as to drive the linear motor, the coil generates heat causing a problem of current loss which may weaken the thrust or cause malfunction of the linear motor.

SUMMARY OF THE INVENTION

An object of the present invention is to provide a linear motor with an improved cooling structure for cooling heat generated from a coil block of the motor.

Another object of the present invention is to provide a linear motor with an improved cooling structure which provides an air circulation to cool heat generated from a coil block of the motor.

Another object of the present invention is to provide a linear motor with an improved cooling structure being capable of reducing noise and air consumption amount by selectively opening/closing an air valve using a shoe provided at a stator element.

The above objects can be accomplished by the present invention providing a linear motor with an improved cooling structure, the linear motor comprising: a stator element having a stator element frame; a movable element having a movable element frame, adapted to linearly move along the stator; and a heat dissipation plate mounted on the stator element frame and the movable element frame, for externally dissipating heat generated from a coil block.

DETAILED DESCRIPTION OF THE INVENTION

Figure 1:
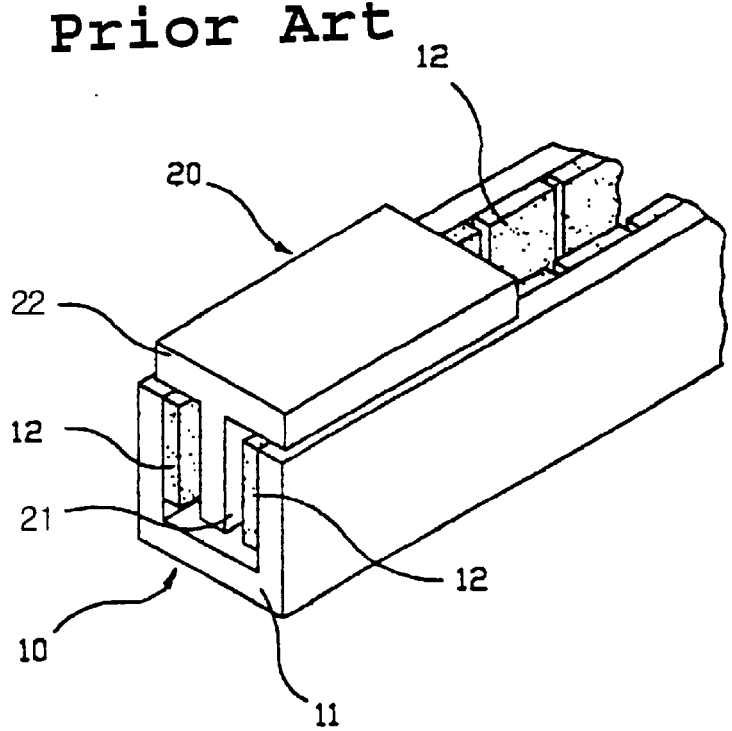
FIG. 1 is a perspective view of a general linear motor.
Figure 2:
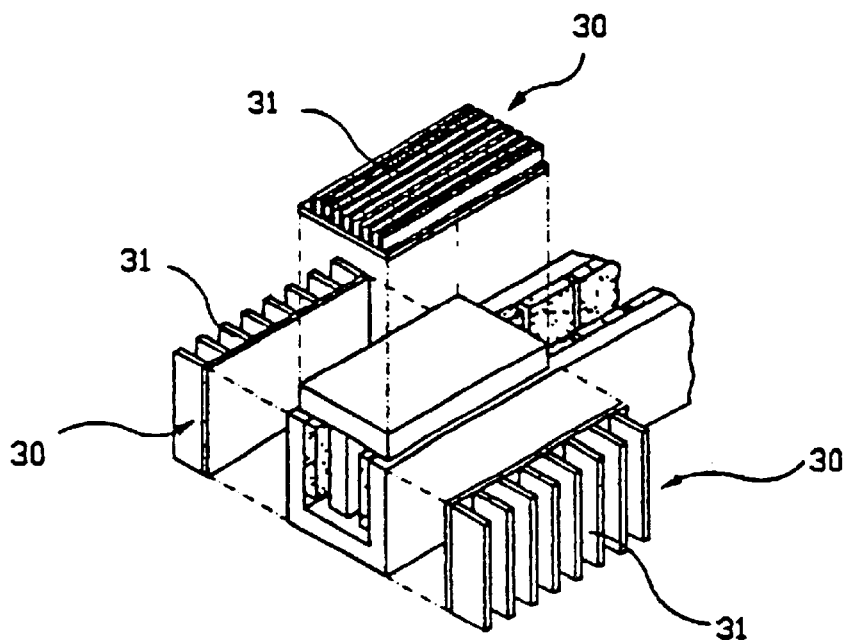
FIG. 2 is a perspective view of a linear motor having a heat dissipating plate in accordance with a first embodiment of the present invention.
Figure 3:
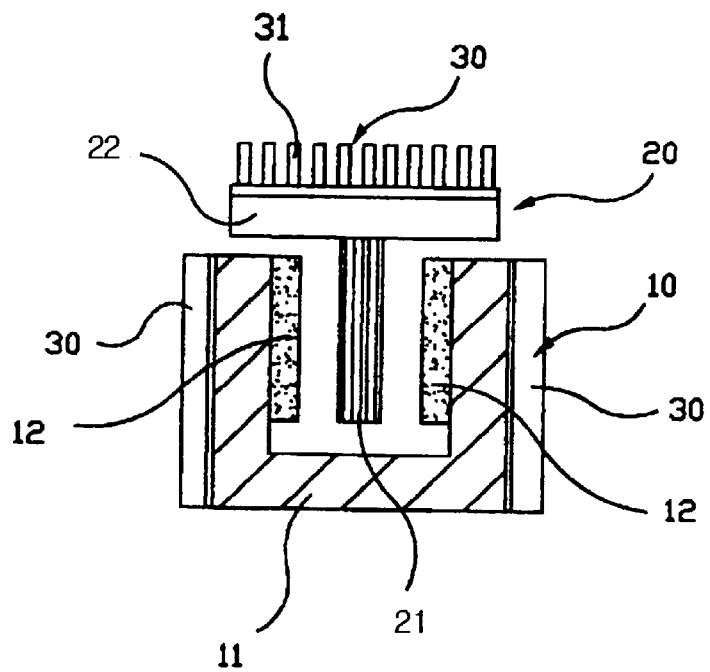
FIG. 3 is a sectional view of a moving coil type of a linear motor.

As shown in FIG. 2 and FIG. 3, a linear motor with an improved cooling structure in accordance with a first embodiment of the present invention comprises: a stator element 10 having a stator frame 11; a movable element 20 having a moving element frame 22 and adapted to linearly move along the stator element 10; and a heat dissipation plate 30 mounted on the stator frame 11 and the moving element frame 22, for externally dissipating heat generated from a coil block 21. The heat dissipation plate 30 is placed at predetermined locations of the stator 10 and the movable element 20. The heat dissipation plate 30 is provided with a plurality of heat dissipation fins 31. It is noted that the linear motor may be a coil moving type linear motor.

As shown in FIG. 3, the stator element 10 includes a stator frame 11 on which permanent magnets 12, each having N- and S-poles, are arranged. The movable element 20 includes a movable element frame 22 having a lower portion thereof on which a coil block 21 is formed. The coil block 21 comprises coils to which external electric current is applied to generate a thrust used to move the movable element 20 under so called Fleming's left-hand rule. The generated thrust force permits direct linear motion of the movable element 20 along the longitudinal direction of the stator element 10.

With the continued supply of current into the coils formed at the coil block 21 of the movable element 20, heat is generated from the coil block 21. To externally dissipate the generated heat, the heat dissipation plate 30 is attached to a predetermined location of either the stator element frame 11 or the movable element frame 22.

An extreme heat dissipation effect may be achieved by an increase in heat dissipation area resulting from the provision of plural heat dissipation fins 31. The heat dissipation plate 30 may be fixedly coupled to either the stator element frame 11 or the movable element frame 22 by means of, such as a screw, a fastening member (not shown).

Figure 4:
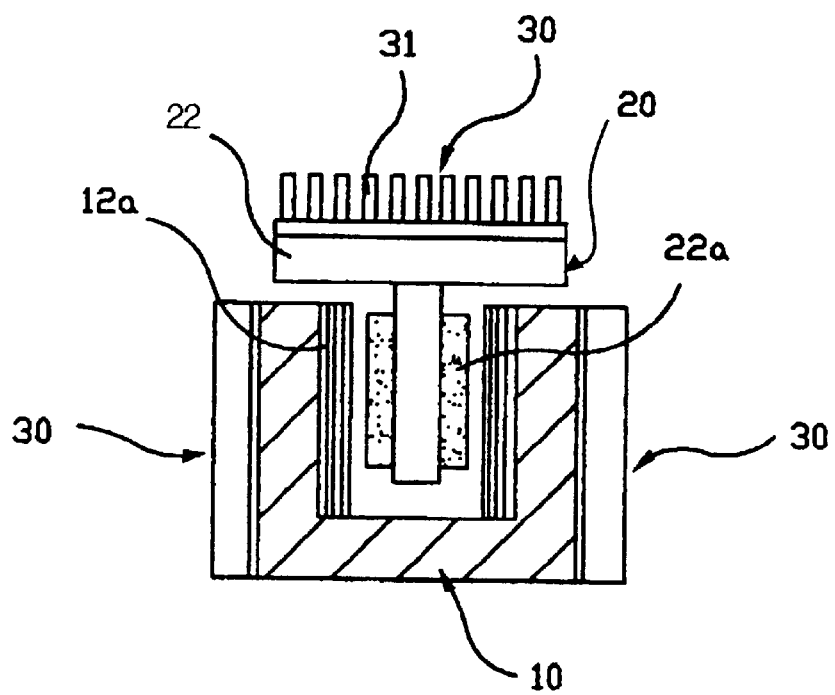
FIG. 4 is a sectional view of a moving magnet type of a linear motor.
Figure 5:
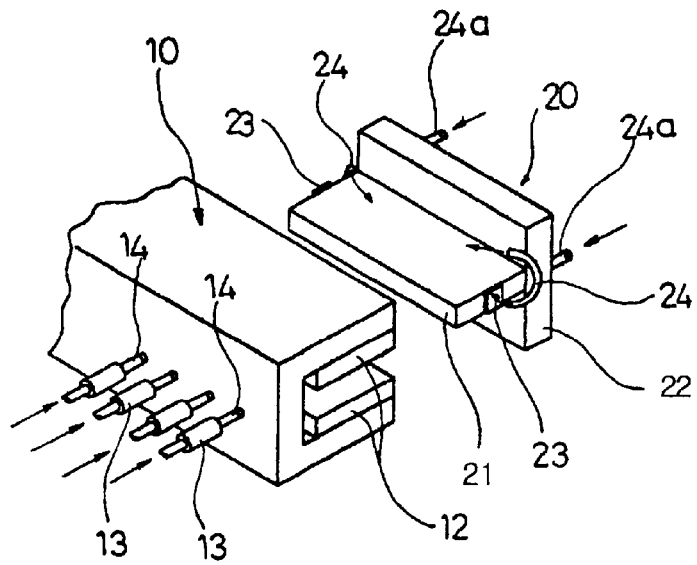
FIG. 5 is a perspective view of a linear motor in accordance with a second embodiment of the present invention.

For a magnet moving type of linear motor, as shown in FIG. 4, the linear motor includes a stator element 10 having a coil block 12a, and a movable element 20 having permanent magnets each having N- and S-poles arranged in an alternating fashion. To externally dissipate heat generated from the coil block 12a provided at the stator element 10, a heat dissipation plate 30 is attached to either the stator element 10 or the movable element 20. The heat dissipation plate 30 serves to externally dissipate heat transferred through the stator element 10 thereto, thereby cooling heat generated from the coils. Further, heat transferred to the permanent magnet 22a of the movable element 20 is transferred to the heat dissipation plate 30 through the movable element frame 22.

While such a heat dissipation plate 30 may be provided at the linear motor, a concentration of heat may occur at a specific area of the stator element 10, depending on the position of the movable element 20. To avoid such an occurrence, the heat dissipation plate 30 may selectively be attached at a specific location. That is, the heat dissipation plate 30 may selectively be placed only at a location of the stator element 10 where the movable element stays for a long while.

Next, a linear motor with an improved cooling structure in accordance with a second embodiment of the present invention will be described below with reference to FIG. 5 to FIG. 8. The linear motor may comprise: a movable element 20; a temperature sensor 23 provided at a coil block 21 of the movable element 20, for sensing heat generated from the coil block 21; a stator 10 having a plurality of via holes 14 arranged with a constant spacing therebetween for an introduction of air; opening/closing valves 13 each provided corresponding to the plurality of the via holes 14, for selective introduction of air therethrough; and a temperature controlling unit 32 which receives a temperature sensing signal from the temperature sensor 23 and selectively open/closes the air flow valves 13.

The stator 10, similarly to the afore-mentioned embodiments, includes a U-shaped stator frame 11 having inner side walls on which permanent magnets 12 each having N- and S-poles are arranged at a predetermined interval. The coil block 21 is placed such that the coil block 21 of the movable element 20 face the permanent magnets 12. The coil block 21 is provided at a bottom surface of the movable element frame 22 to receive an external electric current. When the current is suppled into the coil block 21, a thrust for driving the movable element 20 is generated. The thrust permits a linear motion of the movable element 20 within an inside of the stator element 10.

Figure 6:
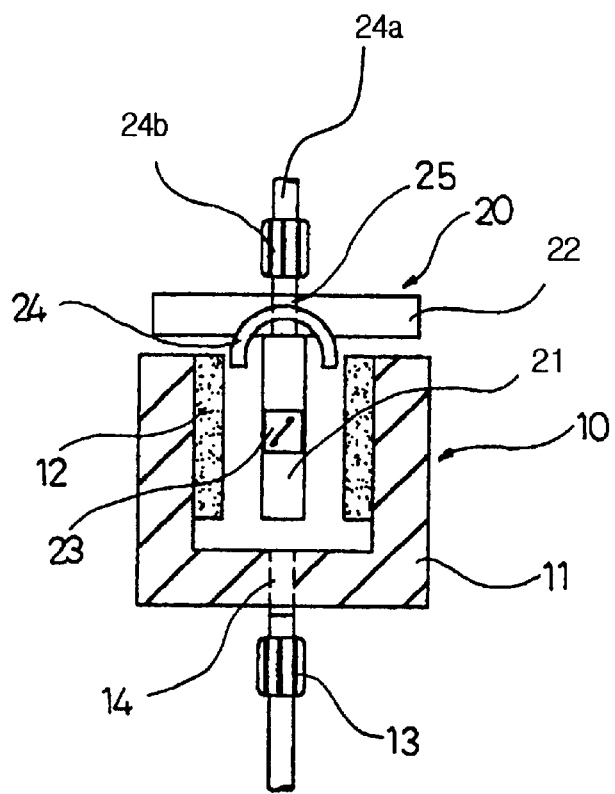
FIG. 6 is a side view of the linear motor shown in FIG. 5.
Figure 7:
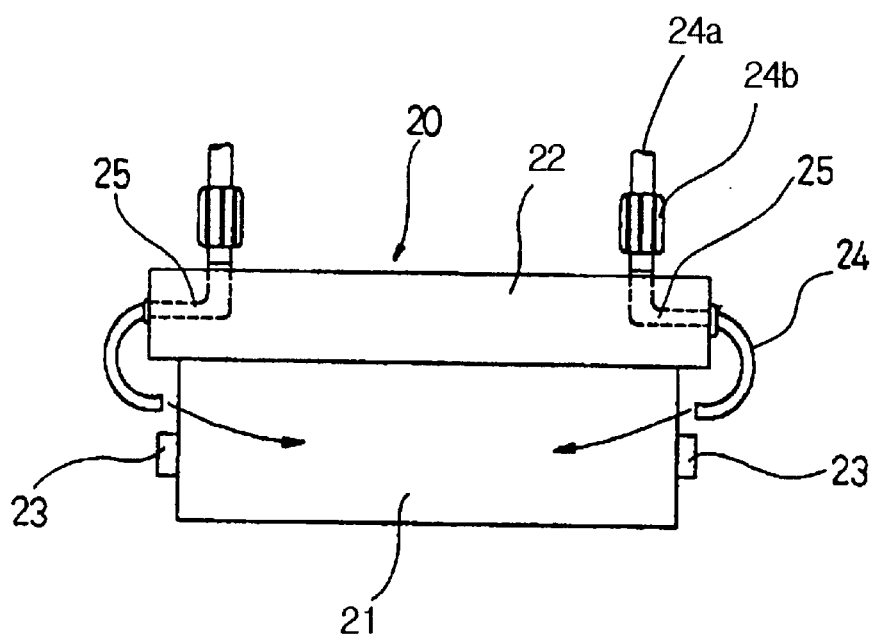
FIG. 7 is a front view of the linear motor shown in FIG. 5.

As shown in FIGS. 6 and FIG. 7, the movable element 20 has an one side thereof provided with tubulate air passages 24a at a predetermined spacing therebetween. Each of the air passage 24a also has a predetermined location thereof provided with an air opening/closing valve 24b. Also, both side surfaces of the coil block 21 are provided with the temperature sensor 23.

Figure 8:
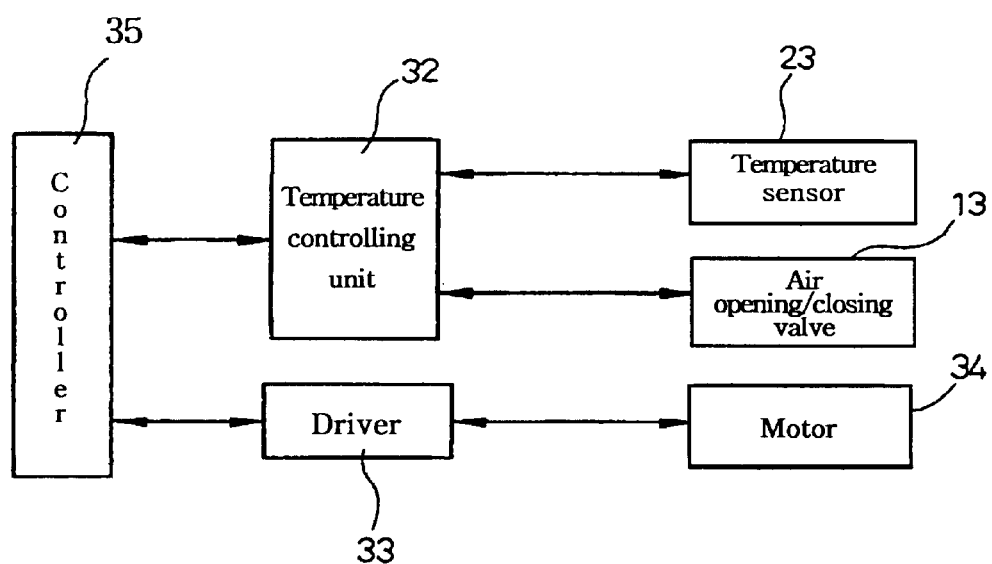
FIG. 8 is a schematic block diagram showing a circuit configuration for a linear motor according to the second embodiment of the present invention.

Meanwhile, for the linear motor with an improved cooling structure in accordance with the second embodiment of the present invention, when the continued supply of the current into the coil block 21 is made to move the movable element 20, high temperature heat is generated from the coil block 21. The generated heat is sensed by the temperature sensor 23 provided at one side of the coil block 21. The temperature sensor 23 senses the heat generated from the coil block 21 and then generate a temperature sensing signal. The generated temperature sensing signal is input to the temperature controlling unit 32 as shown in FIG. 8. Upon receiving the temperature sensing signal, the temperature controlling unit 32 controls a driver 33 to recognize a current position of the movable element 20 from a controller 35 used to driver a motor 34.

The temperature controlling unit 32, when the temperature sensing signal and the position signal are received, compares the input temperature with the preset reference temperature, and, if the preset reference temperature is higher than that of the input temperature, opens the air opening/closing valve 13 located corresponding to the position associated therewith. If the air opening/closing valve 13 opens, air flows in a direction as indicated by arrow shown in FIG. 5. An introduction of air permits a cooling of the coil block 21. Since the selective opening/closing of only the air valve 13 placed at a position of the movable element 20 is made, a consumption amount of air is reduced, and noise can also be further reduced by a minimal number of the air opening/closing valves 13 employed.

The plural air valves 13 are employed which are controlled by the temperature controlling unit 32 and serve to supply air into the via holes formed at the stator 10, and are disposed such that the air valves 13 are connected to the via holes 14 arranged at a predetermined interval. The via holes 14 are formed to penetrate through a region of the stator 10 where the permanent magnets 12 are absent. Then, air is supplied through the via holes 14 into both side surfaces of the coil block 21 of the movable element 20.

The coil block 21 is cooled by air flowing through both side surfaces of the coil block 21. To further enhance the cooling effect, "L"-shaped via holes 25 are provided at both side surfaces of the movable element 20. The L-shaped via hole 25 has one end thereof provided with an air opening/closing valve 24b, and the air opening/closing valves 24 are provided to be selectively opened/closed by the temperature controlling unit 32. As shown in FIG. 7, the air opening/closing valve 24b is operable to cause air to flow in arrow direction along both sides of the coil block 21, by which the cooling effect to the coil block 21 is further improved.

The linear motor with an improved cooling structure in accordance with a second embodiment of the present invention can be configured to be able to control an air flow amount for cooling the coil block, thereby to reduce an air consumption amount. Further, in case the temperature sensor is not employed, it can be designed such that a driving unit for the linear motor can perform a sequential opening/closing of the air valves according to the preset sequence, depending on the current position of the movable element.

Figure 9:
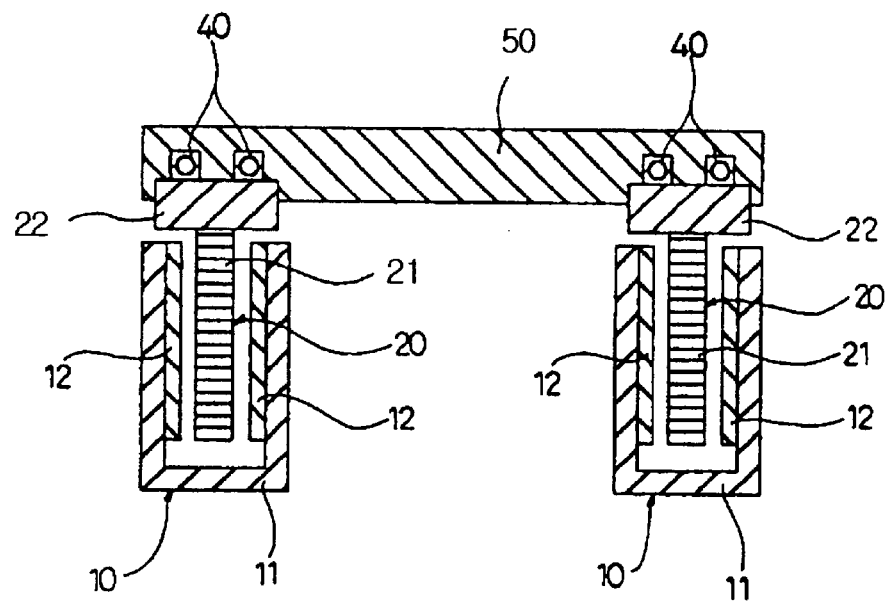
FIG. 9 is a front view of a linear motor in accordance with a third embodiment of the present invention.
Figure 10:
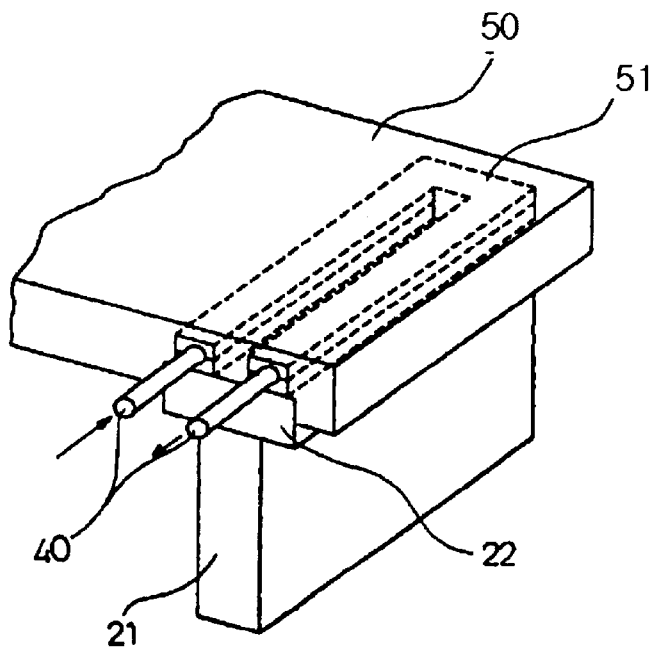
FIG. 10 is a perspective view showing a shoe of a cooling apparatus.
Figure 11:
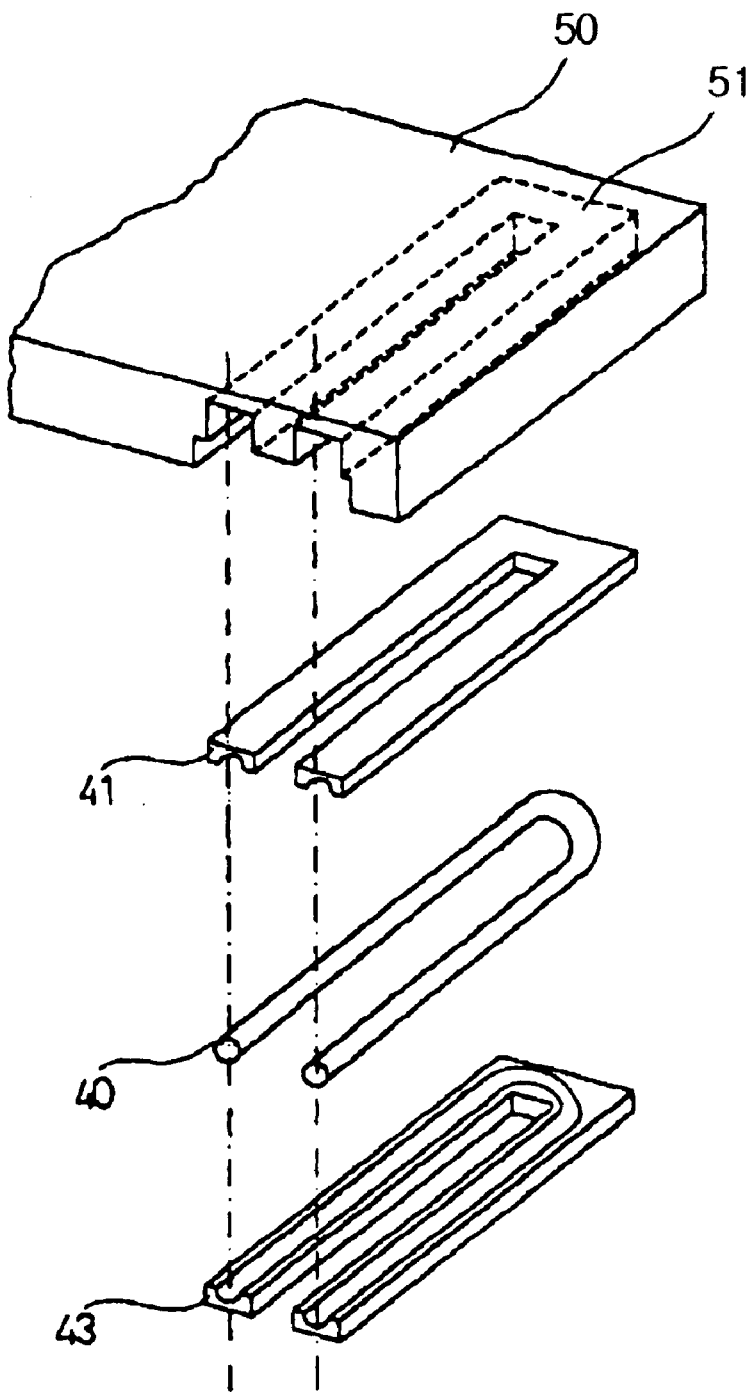
FIG. 11 is an exploded perspective view of the shoe of the cooling apparatus.

Next, referring to FIG. 9 to FIG. 11, a linear motor with an improved cooling structure in accordance with a third embodiment of the present invention may comprise: a pair of stators 10 each having inner side provided with permanent magnets 12 sequentially arranged; a pair of movable elements 20; a pair of movable element frames 22 provided with a coil block 21 corresponding to the pair of stators 20; a shoe 50 for connecting a top portion thereof into the pair of movable element frame 22; and a cooling means provided with an air flow passage for cooling heat generated from the coil block 21, the air flow passage being fixedly disposed between the shoe 50 and the movable element frame 22 and being closely contacting with both the shoe 50 and the frame 22. The cooling means is comprised of air pipes 40 for introducing air thereinto, and an upper frame 41 and a lower frame 42 each formed to wrap the air pipes 40.

The pair of stators 10 comprise stator element frames 11, and a plurality of permanent magnets 12 arranged at both inner surfaces of the pair of stator element frames 11. The coil block 12 fixedly coupled to the movable element frame 22 is provided at inner surface of the stator element 10. The pair of movable element frames 22 have top surfaces fixedly provided with the shoe 50 having the cooling means.

The shoe 50 is provided to prevent the structural deformation caused by heat generated from the coil block 21, i.e., the thermal deformation due to the thermal expansion. It is noted that the air pipes 40 are installed between the shoe 50 and the movable element frame 22. The structure that the air pipes 40 are in close contact with the shoe 50 and the movable element frame 22 permits an easy transfer of heat from the coil block 21 to the air pipes 40.

The air pipes 40 are, as shown in arrow direction shown in FIG. 10, operable to circulate the introduced air from the external and then to externally discharge the circulated air. Thus, heat around the air pipes 40 can be cooled. Therefore, heat generated from the coil block 21 can be easily cooled, this preventing the structural deformation of the shoe 50, caused by heat.

As shown in FIG. 11, the air pipes 40 is shaped like "U"-letter, and the upper and lower frames 41, 42 are in close contact with the top and bottom surfaces of the respective air pipes 40. The upper and lower frames 41, 42 are closely engaged with inner bottom surface of the shoe 50. Then, heat is conducted to the air pipes 40 through the upper and lower frames 41, 42.

The swift cooling of heat generated from the coil block 21 can be achieved by providing the air pipes between the armature frame 22 and the shoe 50.

As described above, over-heating of the linear motor can be prevented by cooling heat generated from the coil block of the linear motor through the use of the heat dissipation plate. Further, according to the present invention, with the provision of the via holes, a noise and an air consumption amount can be reduced by selectively supplying through the air valves an air introduced through the via holes. Moreover, with the provision of the cooling means between the armature frame and the shoe, the prompt cooling of heat generated from the coil block can be accomplished, and the structural deformation of the shoe, caused by heat, can also be prevented.

What is claimed is:

1. A linear motor having an electromagnetically operable coil block comprising:
    (a) a stator element having a stator element frame;
    (b) a movable element having a movable element frame, said movable element being linearly displaceable relative to said stator element; and,
    (c) at least first and second heat dissipation plate portions mounted respectively to said stator element frame and said movable element frame for dissipating heat generated by the coil block, each of said first and second heat dissipation plate portions including a plurality of dissipation fins.

2. The linear motor as recited in claim 1 wherein each said stator element frame includes a pair of outer sidewalls, said first heat dissipation plate portion overlaying said stator element frame outer sidewalls.

3. A cooled linear motor comprising:
    (a) a movable element including an electromagnetically operable coil block, said movable element having formed therein a plurality of air passages, at least one of said air passages having a substantially L-shaped section;
    (b) at least one temperature sensor coupled to said coil block for sensing heat generated thereby;
    (c) a stator element having formed therein a plurality of through holes spaced one from the other for the passage of air therethrough;
    (d) at least one first air flow control valve coupled to at least one said through hole of said stator element;
    (e) at least one second air flow control valve coupled to at least one said air passages of said movable element; and,
    (f) a temperature controlling unit coupled to said temperature sensor and said air flow control valves, said temperature controlling unit being operable responsive to a temperature signal generated by said temperature sensor to selectively open and close said air flow control valve.

4. A cooled linear motor comprising:
    (a) a movable element including an electromagnetically operable coil block;
    (b) at least one temperature sensor coupled to said coil block for sensing heat generated thereby;
    (c) a stator element having formed therein a plurality of through holes spaced one from the other for the passage of air therethrough;
    (d) at least one air flow control valve coupled to at least one said through hole of said stator element; and,
    (e) a temperature controlling unit coupled to said temperature sensor and said air flow control valve, said temperature controlling unit being operable responsive to both a temperature signal generated by said temperature sensor and the relative positions of said movable and stator elements to selectively open and close said air flow control valve.

5. A cooled linear motor comprising:
    (a) a pair of movable elements each including a movable element frame having an electromagnetically operable coil block;
    (b) a pair of stator elements each including an inner side portion having at least one set of permanent magnets sequentially arranged thereon;
    (c) a connecting member coupled to extend between said movable element frames; and,
    (d) at least one cooling assembly disposed between said connecting member and at least one said movable element frame, said cooling assembly defining an air flow passage for guiding the escape of heat generated by said coil block.

6. The cooled linear motor as recited in claim 5 wherein said cooling assembly includes upper and lower frames and at least one air pipe seated therebetween, said air pipe defining said air flow passage.

7. The cooled linear motor as recited in claim 5 wherein said cooling assembly includes a substantially U-shaped air pipe describing said air flow passage.

8. A cooled linear motor comprising:
    (a) a movable element including an electromagnetically operable coil block, said movable element having formed therethrough a plurality of air pipes;
    (b) at least one temperature sensor coupled to said coil block for sensing heat generated thereby;
    (c) a stator element having formed therein a plurality of through holes spaced one from the other for the passage of air therethrough, said through holes being disposed in open communication with said air pipes of said movable element;
    (d) a first air flow control valve coupled to at least one said through hole of said stator element;
    (e) a second air flow control valve coupled to at least one said air pipe of said movable element; and,
    (f) a temperature controlling unit coupled to said temperature sensor and said air flow control valves, said temperature controlling unit being operable responsive to a temperature signal generated by said temperature sensor to selectively open and close said air flow control valve.

* * * * *